United States Patent
Woo

(10) Patent No.: US 8,029,407 B2
(45) Date of Patent: Oct. 4, 2011

(54) PLANETARY GEAR SET EQUIPPED WITH PINION SHAFT AND CARRIER

(75) Inventor: Yeon Cheon Woo, Seoul (KR)

(73) Assignee: Hyundai Motor Company, Seoul (KR)

( * ) Notice: Subject to any disclaimer, the term of this patent is extended or adjusted under 35 U.S.C. 154(b) by 725 days.

(21) Appl. No.: 12/030,318

(22) Filed: Feb. 13, 2008

(65) Prior Publication Data

US 2009/0105033 A1    Apr. 23, 2009

(30) Foreign Application Priority Data

Oct. 19, 2007  (KR) .................. 10-2007-0105547

(51) Int. Cl.
*F16H 57/08* (2006.01)
(52) U.S. Cl. ........................................ 475/331
(58) Field of Classification Search .................. 475/331
See application file for complete search history.

(56) References Cited

U.S. PATENT DOCUMENTS

| 801,517 | A | * | 10/1905 | Fairfax | 475/149 |
|---|---|---|---|---|---|
| 1,217,427 | A | * | 2/1917 | Fast | 475/344 |
| 1,299,156 | A | * | 4/1919 | Fast | 384/291 |
| 1,786,158 | A | * | 12/1930 | Hawes | 475/329 |
| 2,044,203 | A | * | 6/1936 | Boykin, Jr. | 475/343 |
| 2,157,728 | A | * | 5/1939 | Bloss | 475/159 |
| 2,688,263 | A | * | 9/1954 | Rockwell | 475/338 |
| 4,222,290 | A | * | 9/1980 | Helmer et al. | 475/159 |
| 6,796,031 | B1 | * | 9/2004 | Russell | 29/898.09 |

FOREIGN PATENT DOCUMENTS

| KR | 20-1990-5571 U | 3/1990 |
|---|---|---|
| KR | 10-1998-045972 A | 9/1998 |

* cited by examiner

*Primary Examiner* — Ha D. Ho
(74) *Attorney, Agent, or Firm* — Morgan, Lewis & Bockius LLP

(57) ABSTRACT

A planetary gear set equipped with a pinion shaft and a carrier may include a pinion shaft having a engaging portion that protrudes in a longitudinal direction on an end thereof; a carrier into which the engaging portion of the pinion shaft is inserted; and a fastener engaged to the engaging portion of the pinion shaft, such that a portion of the carrier is fixed to the pinion shaft.

13 Claims, 3 Drawing Sheets

PLANETARY GEAR SET EQUIPPED WITH PINION SHAFT AND CARRIER

CROSS-REFERENCE TO RELATED APPLICATION

This application claims priority to and the benefit of Korean Patent Application No. 10-2007-0105547, filed in the Korean Intellectual Property Office on Oct. 19, 2007, the entire contents of which are incorporated herein by reference.

BACKGROUND OF THE INVENTION (a) Field of the Invention

The present invention relates to a planetary gear set, and more particularly, to the planetary gear set in which a coupling structure of a pinion shaft and a carrier is improved.

(b) Description of the Related Art

Generally, a planetary gear set includes a carrier assembly connecting a sun gear, a ring gear, and a pinion gear with each other. The carrier assembly further includes a carrier and a pinion-shaft fixed to the carrier.

There are several methods for fixing the pinion shaft to the carrier. A typical method is that holes are made at some portions of the pinion shaft and the carrier, and a pin is inserted into the holes.

FIG. 3 is a partial cross-sectional view of a planetary gear set of a related art.

Referring to FIG. 3, a planetary gear set 10 includes pinion shaft 12, pinion gear 16, and carriers 30a and 30b. A bearing 32 is interposed between an interior circumference of the pinion gear 16 and an exterior circumference of the pinion shaft 12, and the pinion gear 16 rotates about a center axis of the pinion shaft 12. Also the carriers 30a and 30b are engaged to distal ends of the pinion shaft 12 respectively, and a spline 28 is formed on an exterior circumference of the carrier 30b.

A first pin hole 22a is formed in the right end portion of the pinion shaft 12, and the carrier 30a is provided at a portion where the first pin hole 22a is formed. As shown, a second pin hole 22b is also formed in the carrier 30a, A fixing pin 20 is inserted into the first and the second pin holes 22a and 22b together. Thus the pinion shaft 12 and the carrier 30a are engaged with each other.

However, since the fixing pin 20 is forcefully fitted when the fixing pin 20 is inserted to the pin holes 22a and 22b, it is difficult to insert the fixing pin 20 in the pin holes 22a and 22b.

In addition, there is a problem in that residual stress occurs between the fixing pin 20 and the pin holes 22a and 22b. If residual stress is increased, the size of components around the fixing pin 20 or the pin holes 22a and 22b can be changed. Further, it is difficult to draw out the fixing pin 20 from the pin holes so as to disassemble the pinion shaft 12 from the carrier 30a.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a planet gear set equipped with a pinion shaft and a carrier having advantages that a coupling structure is improved so as to easily assemble or disassemble a carrier and a pinion shaft, and that a coupling structure of a carrier and a pinion is secured.

A planetary gear set equipped with a pinion shaft and a carrier according to an exemplary embodiments of the present invention may include: a pinion shaft having an engaging portion that protrudes in a longitudinal direction on an end side; a carrier in which the engaging portion of the pinion shaft is inserted; and a fastener engaged to the engaging portion of the pinion shaft so that it fixes a portion of the carrier to the pinion shaft.

A protruding portion of the carrier may be formed toward a center axis of the pinion shaft, the protruding portion may be interposed between the pinion shaft and the fastener in series, and the protruding portion may be continually or intermittently formed along an interior circumference of a portion of the carrier.

In an exemplary embodiment of the present invention, at least a protrusion may be formed around the engaging portion and may protrude on a distal end side of the pinion shaft, and at least a protrusion groove may be formed on a portion of the carrier. The protrusion is inserted into the protrusion groove.

In another embodiment of the present invention, at least a protrusion may be formed on the protrusion portion of the carrier and at least a protrusion groove may be formed on the distal end portion of the pinion shaft. The protrusion is inserted into the protrusion groove.

The fastener may be nut-shaped, and the engaging portion and the fastener may be screw-coupled with each other.

A planetary gear set equipped with pinion shaft and carrier according to an exemplary embodiment of the present invention can fix the carrier to the pinion shaft with ease by engaging the fastener to the engaging portion of the pinion shaft. The fastener presses the protrusion portion of the carrier to the one side of the pinion shaft, so that a coupling structure of the pinion shaft and the carrier can be more secured.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
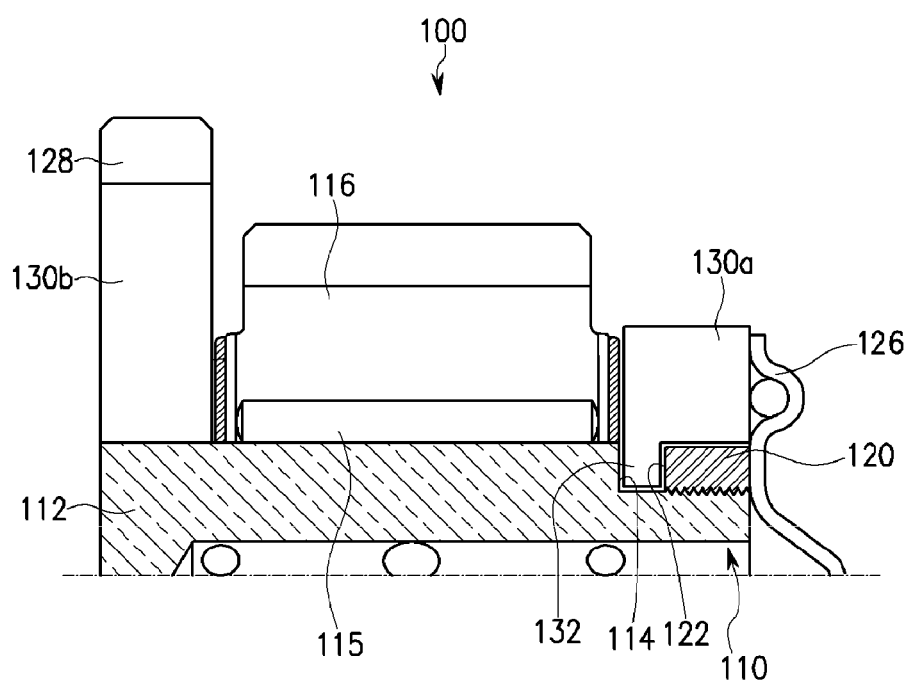
FIG. 1 is a cross-sectional view of a planetary gear set according to the first exemplary embodiment of the present invention.

DESCRIPTION OF REFERENCE NUMERALS INDICATING PRIMARY ELEMENTS IN THE DRAWINGS 100, 200: planetary gear set
110, 210: engaging portion
112, 212: pinion shaft
114, 214: first side
115: bearing
116: pinion gear 122, 222: second side
120, 220: fastener
126: oil guide
128: spline
130a, 130b, 230a: carrier
132, 232: protruding portion
202: protrusion
204: protrusion groove
206: center axis
208: thread It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown.

FIG. 1 is a cross-sectional view of a planetary gear set according to the first exemplary embodiment of the present invention.

Referring to FIG. 1, a planetary gear set 100 includes a pinion shaft 112, a bearing 115 provided on the exterior circumference of the pinion shaft 112, a pinion gear 116 revolving the pinion shaft 112, and carriers 130a and 130b provided on the pinion shaft 112.

A spline 128 also is formed on the exterior circumference of the left carrier 130b and an oil guide 126 is equipped on the outer surface of the right carrier 130a. A detailed description regarding the spline 128 and the oil guide 126 are not presented in the exemplary embodiment of the present invention.

As shown in FIG. 1, a first side 114 is formed on the right distal end portion of the pinion shaft 112, for example and a second side 122 is formed on a left distal end portion of a fastener 120 as shown in FIG. 1. The second side 122 of the fastener 120 and the first side 114 of the pinion shaft 112 face each other.

Referring to FIG. 1, coupling structure regarding the right portion of the pinion shaft 112 is detailed. An engaging portion 110 protrudes in a longitudinal direction of the pinion shaft 112 from the right distal end portion of the pinion shaft 112 and positioned below the first side 114 of the pinion shaft 112, and the fastener 120 is engaged to the engaging portion 110. An explanation about the fastener 120 will be followed later.

Further, a protruding portion 132 is formed along an interior circumference of a portion of the right carrier 130a toward a center of the engaging portion 110, and the protruding portion 132 is disposed in a space between the first side 114 of the pinion shaft 112 and the second side 122 of the fastener 120.

Hereafter a preferred practical assembling procedure is detailed. First, the right carrier 130a is disposed along the engaging portion 110 extending from the pinion shaft 112. Next, the fastener 120 is engaged to a portion of the engaging portion 110. At this time, the second side 222 of the fastener 120 fixes the protruding portion 132 of the right carrier 130a to the first side 114 of the pinion shaft 112.

As shown in an exemplary embodiment of the present invention, the engaging portion 110 and the fastener 120 can be engaged by a screw structure with each other. In addition, the fastener 120 can be forcefully fitted to the engaging portion 110.

Also in the exemplary embodiment of the present invention, the fastener 120 preferably has a ring shape comprising an interior circumference and an exterior circumference. Further the right carrier 130a has a ring shape having an interior circumference, and the protruding portion 132 is formed continually or intermittently tracing below an interior circumference of a portion of the right carrier 130a. The exterior circumference of the fastener 120 is smaller than the interior circumference of the right carrier 130a to receive the fastener 120 complementarily.

From this structural configuration of the present invention, the right carrier 130a can be easily assembled to or disassembled from the pinion shaft 112 by screw-coupling or screw-uncoupling the fastener 120.

Figure 2:
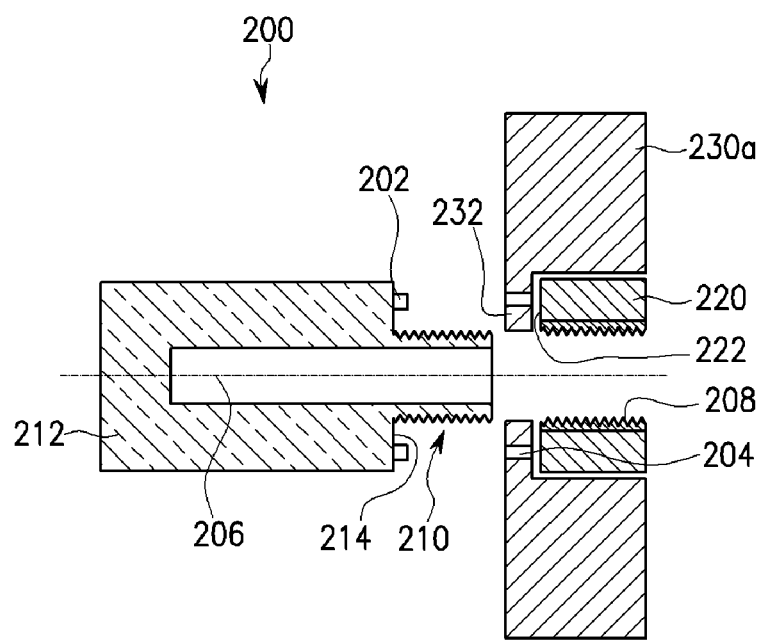
FIG. 2 is an exploded sectional view of the planetary gear set according to the second exemplary embodiment of the present invention.

FIG. 2 is an exploded sectional view of the planetary gear set 200 according to the second exemplary embodiment of the present invention.

Referring to FIG. 2, an engaging portion 210 protrudes in a longitudinal direction from a first side 214 of one distal end portion of the pinion shaft 212, and the center line of the engaging portion 210 is a center axis 206 of the pinion shaft 212, i.e., the engaging portion 210 and the pinion shaft 212 are coaxially aligned.

Further, a protrusion 202 may be formed on the first side 214 of the pinion shaft 212, extending toward the carrier 230 in parallel to the engaging portion 210.

A protrusion groove 204 into which the protrusion 202 is inserted is formed in a protrusion portion 232 of a right carrier 230a.

By inserting the protrusion 202 formed on the pinion shaft 212 into the protrusion groove 204, the pinion shaft 212 and the carrier 230a are engaged with each other firmly. The length of the protrusion 202 is shorter than or equal to the length of the protrusion groove 204.

A fastener 220 is engaged with the pinion shaft 212 in the right direction in the drawing and then a second side 222 of the fastener 220 pushes the protruding portion 232 of the carrier 230a to the first side 214 of the pinion shaft 212, so as to fasten the carrier 230a between the pinion shaft 212 and the fastener 220.

As shown in an exemplary embodiment of the present invention, it is preferred that a thread 208 is formed on the interior circumference of the fastener 220 so as to screw-couple the fastener 220 to the engaging portion 210 formed on the distal end portion of the pinion shaft 212.

Also in an exemplary embodiment of the present invention, one or several protrusion 202 can be provided in the first side 214 of the pinion shaft 212. The protrusions 202 can also be disposed to be spaced apart from one another, tracing along the first side 214 of the pinion shaft 212.

The protrusion 202 is formed in the pinion shaft 212 and the protrusion groove 204 is formed in the carrier 230a in the present exemplary embodiment. However, in contrast, at least a protrusion groove may be formed in the pinion shaft 212 and at least a protrusion may be formed in the carrier 230a in another exemplary embodiment.

Figure 3:
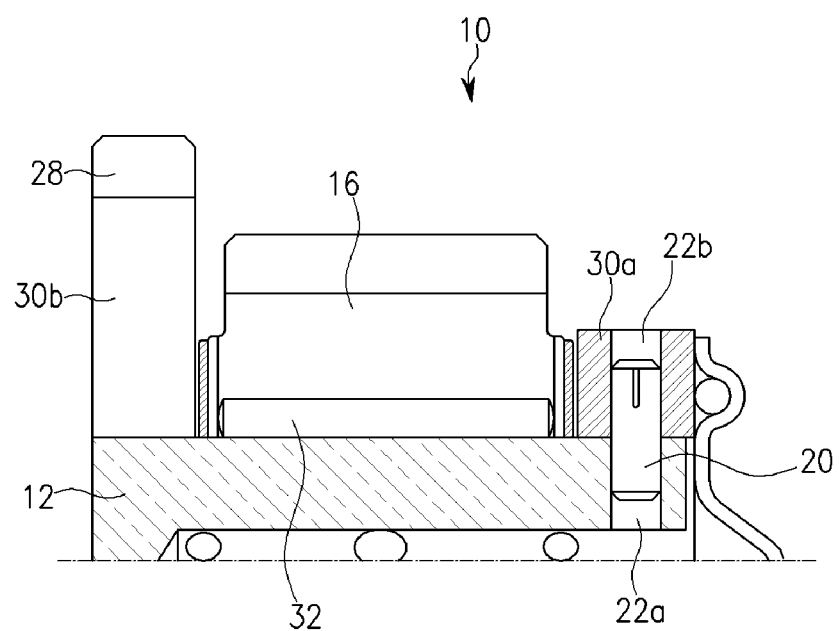
FIG. 3 is a partial cross-sectional view of the planetary gear set of a related art.

In a related art shown in FIG. 3, in which the pinion shaft 12 is engaged with the carrier 30a by forcefully fitting a fixing pin 20, it is difficult to draw out the fixing pin 20. However the carrier 130a or 230a and the pinion shaft 112 or 212 can be easily assembled to or disassembled from the engaging portion 110 or 210 by only rotating the fastener 120 or 220 in the exemplary embodiment of the present invention Also in the exemplary embodiment of the present invention, the fastener 120 or 220 may have a ring shape opened in both sides or a cup shape having one side opened. In another embodiment, the fastener 220 may be formed as a nut shape and thereby tools like a spanner can be used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear set equipped with a pinion shaft and at least a carrier, comprising:
   the pinion shaft having an engaging portion that protrudes from a distal end portion thereof in a longitudinal direction of the pinion shaft;
   the carrier into which the engaging portion of the pinion shaft is inserted; and
   a fastener engaged in series of the carrier and the fastener, to the engaging portion, such that an interior circumference of a portion of the carrier is fixed to the pinion shaft;
   wherein the portion of the carrier comprises a protruding portion protruding toward a center axis of the engaging portion, and the protruding portion of the carrier is interposed between the pinion shaft and the fastener in series; and
   wherein at least a protrusion is formed on a first side of the pinion shaft around the engaging portion wherein the first side is formed on the distal end portion of the pinion shaft and between an exterior circumference of the engaging portion and an exterior circumference of the pinion shaft.

2. The planetary gear set of claim 1, wherein
   the protruding portion is continually formed tracing the interior circumference of the carrier.

3. The planetary gear set of claim 1, wherein
   the protruding portion is formed tracing the interior circumference of the carrier.

4. The planetary gear set of claim 1, wherein
   at least a protrusion groove is formed in the protruding portion of the carrier corresponding to the protrusion, and the protrusion is inserted into the protrusion groove.

5. The planetary gear set of claim 1, wherein
   the protrusion is formed intermittently along the first side of the pinion shaft.

6. The planetary gear set of claim 1, wherein
   the fastener is inserted into the carrier fully or partially to be engaged with the engaging portion wherein a second side of the fastener pushes the interior circumference of the portion of the carrier toward the first side of the pinion shaft to fasten the carrier and
   the first side of the pinion shaft and the second side of the fastener face each other.

7. The planetary gear set of claim 1, wherein the pinion shaft and the engaging portion are aligned coaxially.

8. The planetary gear set of claim 7, wherein the engaging portion and the fastener are aligned coaxially.

9. The planetary gear set of claim 1, wherein
   the engaging portion and the fastener are screw-coupled with each other.

10. The planetary gear set of claim 9, wherein the fastener is nut-shaped.

11. The planetary gear set of claim 9, wherein the fastener has a ring shape opened in both sides or a cup shape having one side opened.

12. A planetary gear set equipped with a pinion shaft and at least a carrier, comprising:
    the pinion shaft having an engaging portion that protrudes from a distal end portion thereof in a longitudinal direction of the pinion shaft;
    the carrier into which the engaging portion of the pinion shaft is inserted; and
    a fastener engaged in series of the carrier and the fastener, to the engaging portion, such that an interior circumference of a portion of the carrier is fixed to the pinion shaft;
    wherein the portion of the carrier comprises a protruding portion protruding toward a center axis of the engaging portion, and the protruding portion of the carrier is interposed between the pinion shaft and the fastener in series; and
    wherein at least a protrusion groove is formed on a first side of the pinion shaft around the engaging portion wherein the first side is formed on the distal end portion of the pinion shaft and between an exterior circumference of the engaging portion and an exterior circumference of the pinion shaft.

13. The planetary gear set of claim 12, wherein
    at least a protrusion is formed in the protruding portion of the carrier corresponding to the protrusion groove, and the protrusion is inserted into the protrusion groove.

* * * * *